United States Patent
Hu

(10) Patent No.: US 9,994,326 B2
(45) Date of Patent: *Jun. 12, 2018

(54) DEICER BOOTS HAVING ELASTOMER FIBERS WITH ALIGNED CARBON ALLOTROPE MATERIALS

(71) Applicant: Goodrich Corporation, Charlotte, NC (US)

(72) Inventor: Jin Hu, Hudson, OH (US)

(73) Assignee: Goodrich Corporation, Charlotte, NC (US)

( * ) Notice: Subject to any disclaimer, the term of this patent is extended or adjusted under 35 U.S.C. 154(b) by 184 days.

This patent is subject to a terminal disclaimer.

(21) Appl. No.: 15/140,024

(22) Filed: Apr. 27, 2016

(65) Prior Publication Data

US 2016/0347461 A1 Dec. 1, 2016

Related U.S. Application Data

(60) Provisional application No. 62/166,527, filed on May 26, 2015.

(51) Int. Cl.
*B29C 70/14* (2006.01)
*B64D 15/16* (2006.01)
(Continued)

(52) U.S. Cl.
CPC ............ *B64D 15/166* (2013.01); *B29C 70/14* (2013.01); *B29C 70/18* (2013.01); *B29C 70/42* (2013.01);
(Continued)

(58) Field of Classification Search
CPC ......... B29C 70/14; B29C 70/18; B29C 70/42; B64D 15/166; D01D 5/003;
(Continued)

(56) References Cited

U.S. PATENT DOCUMENTS

| 4,613,102 A * | 9/1986 | Kageorge ............ B64D 15/166 244/134 A |
| 4,687,159 A * | 8/1987 | Kageorge ............ B64D 15/166 244/134 A |

(Continued)

FOREIGN PATENT DOCUMENTS

| EP | 0720946 A1 * | 7/1996 | ............ B64D 15/00 |
| EP | 0720946 A1 | 7/1996 | |

(Continued)

OTHER PUBLICATIONS

Extended European Search Report for Application No. 16171108.0, dated Sep. 19, 2016, 10 pages.
(Continued)

*Primary Examiner* — Justin M Benedik
(74) *Attorney, Agent, or Firm* — Kinney & Lange, P.A.

(57) ABSTRACT

A deicer boot includes an aircraft structure and an outer layer. The outer layer includes a plurality of elastomer fibers and a carbon allotrope material. The carbon allotrope material is aligned with at least one elastomer fiber belonging to the plurality of elastomer fibers. A method of forming a layer of a deicer boot includes aligning a carbon allotrope material with a first elastomer fiber, joining the first elastomer fiber with a plurality of additional elastomer fibers to form a non-woven fiber fabric, and incorporating the non-woven fiber fabric into a sheet.

20 Claims, 3 Drawing Sheets

(51) Int. Cl.

| | |
|---|---|
| *B29C 70/18* | (2006.01) |
| *B29C 70/42* | (2006.01) |
| *D01D 5/00* | (2006.01) |
| *B29K 75/00* | (2006.01) |
| *B29K 105/08* | (2006.01) |
| *B29K 105/16* | (2006.01) |
| *B29K 505/02* | (2006.01) |
| *B29K 507/04* | (2006.01) |
| *B29L 31/30* | (2006.01) |

(52) U.S. Cl.
CPC .......... *D01D 5/003* (2013.01); *B29K 2075/00* (2013.01); *B29K 2105/0863* (2013.01); *B29K 2105/16* (2013.01); *B29K 2505/02* (2013.01); *B29K 2507/04* (2013.01); *B29L 2031/3085* (2013.01)

(58) Field of Classification Search
CPC ........ B29K 2075/00; B29K 2105/0863; B29K 2105/16; B29K 2507/04; B29K 2505/02; B29L 2031/2085

See application file for complete search history.

(56) References Cited

U.S. PATENT DOCUMENTS

| | | | | |
|---|---|---|---|---|
| 4,690,353 | A * | 9/1987 | Haslim | B64D 15/163 244/134 D |
| 5,098,037 | A * | 3/1992 | Leffel | B64D 15/166 244/134 A |
| 5,164,242 | A * | 11/1992 | Webster | B64D 15/16 156/60 |
| 5,314,145 | A | 5/1994 | Rauchhorst, III et al. | |
| 5,337,978 | A * | 8/1994 | Fahrner | B64D 15/166 244/134 A |
| 5,544,845 | A | 8/1996 | Giamati et al. | |
| 5,558,304 | A * | 9/1996 | Adams | B64D 15/00 244/134 A |
| 5,609,314 | A * | 3/1997 | Rauckhorst, III | B64D 15/16 244/134 A |
| 5,743,494 | A * | 4/1998 | Giamati | B64D 15/00 244/134 A |
| 5,921,502 | A * | 7/1999 | Al-Khalil | B64D 15/163 244/134 A |
| 6,352,601 | B1 * | 3/2002 | Ray | B64D 15/00 156/71 |
| 6,520,452 | B1 | 2/2003 | Crist et al. | |
| 7,070,836 | B2 | 7/2006 | Czado | |
| 7,832,983 | B2 | 10/2010 | Kruckenberg et al. | |
| 8,662,449 | B2 | 3/2014 | Shah et al. | |
| 8,664,573 | B2 | 3/2014 | Shah et al. | |
| 9,598,176 | B2 * | 3/2017 | Giamati | B64D 15/166 |
| 2006/0094320 | A1 | 5/2006 | Chen et al. | |
| 2009/0326128 | A1 | 12/2009 | Macossary-Torres | |
| 2011/0027067 | A1 | 2/2011 | Kennedy, III et al. | |
| 2012/0224897 | A1 * | 9/2012 | Qi | B82Y 30/00 399/333 |
| 2013/0115420 | A1 | 5/2013 | Park et al. | |
| 2014/0065422 | A1 | 3/2014 | Kim et al. | |

FOREIGN PATENT DOCUMENTS

| | | |
|---|---|---|
| GB | 1165381 | 9/1969 |
| WO | WO2006123858 A1 | 11/2006 |
| WO | WO2008085550 * | 7/2008 |
| WO | WO2008085550 A2 | 7/2008 |
| WO | WO2009094506 A1 | 7/2009 |

OTHER PUBLICATIONS

W.K. Son et al., "Preparation of Antimicrobial Ultrafine Cellulose Acetate Fibers with Silver Nanoparticles", from Macromolecular Rapid Communication, 2004, pp. 1632-1637.

L.Y. Yeo et al., "Electrospinning Carbon Nanotube Ploymer Composite Nanofibers", from Journal of Experimental Nanoscience, Jun. 2006, pp. 177-209.

S. Sirinrath et al., "Skeletal Myotube Formation Enhanced by Electrospun Polyurethane Carbon nanotube Scaffolds", from International Journal of Nanomedicine, 2011, pp. 2483-2497.

M. Gopiraman et al., "Structural and Mechanical Properties of Cellulose Acetate/Graphene Hybrid Nanofibers: Spectroscopic Investigations", from eXPRESS Polymer Letters, 2013, pp. 554-563.

Q. Dong et al., "Ultrasound-assisted Preparation of Electrospun Carbon Nanofiber/Graphene Composite Electrode for Supercapacitors", from Journal of Power Sources, 2013, pp. 350-353.

* cited by examiner

DEICER BOOTS HAVING ELASTOMER FIBERS WITH ALIGNED CARBON ALLOTROPE MATERIALS

CROSS-REFERENCE TO RELATED APPLICATION(S)

This application claims the benefit of U.S. Provisional Application No. 62/166,527 filed May 26, 2015 for "Deicer Boots Having Elastomer Fibers With Aligned Carbon Allototrope Materials" by Jin Hu.

BACKGROUND

Accumulation of ice on aircraft wings and other aircraft structures during flight is a known issue. A variety of techniques have been used to remove ice from aircraft during flight including chemical deicing (applying chemicals to aircraft structures to reduce ice adhesion forces or reduce the freezing point of water that collects on the aircraft), thermal deicing (actively heating aircraft structures to prevent ice formation or loosen accumulated ice), and pneumatic deicing (using inflatable elements to expand the profile of an aircraft structure to crack accumulated ice).

Some state of the art pneumatic deicers (sometimes called deicer boots) employ a neoprene or polyester urethane outer layer positioned over a natural rubber inner layer, which is connected to an aircraft structure. Inflation tubes are positioned between the inner layer and the aircraft structure. The inflation tubes inflate causing portions of the outer and inner layers to move away from the aircraft structure. This movement deforms the outer layer so that ice that has accumulated on the outer layer cracks and is shed from the outer layer. Neoprene and polyester urethane outer layers generally possess adequate toughness, wind and sand erosion resistance, and chemical resistance to fuel and oil, but do not generally retract well at low temperatures. The natural rubber inner layer is used to improve the elasticity and retractability of the outer layer. The present disclosure describes improved compositions for deicer boots.

SUMMARY

A deicer boot includes an aircraft structure and an outer layer. The outer layer includes a plurality of elastomer fibers and a carbon allotrope material. The carbon allotrope material is aligned with at least one elastomer fiber belonging to the plurality of elastomer fibers.

A method of forming a layer of a deicer boot includes aligning a first elastomer fiber with a carbon allotrope material, joining the first elastomer fiber with a plurality of additional elastomer fibers to form a non-woven fiber fabric, and incorporating the non-woven fiber fabric into a sheet.

A deicer boot includes an aircraft structure and an outer layer. The outer layer includes a plurality of elastomer fibers and aluminum flake. The aluminum flake is aligned with at least one elastomer fiber belonging to the plurality of elastomer fibers.

DETAILED DESCRIPTION

The present disclosure describes elastomeric deicer boots having improved elasticity and mechanical strength compared to the currently deployed neoprene and polyurethane deicer boots.

Figure 1:
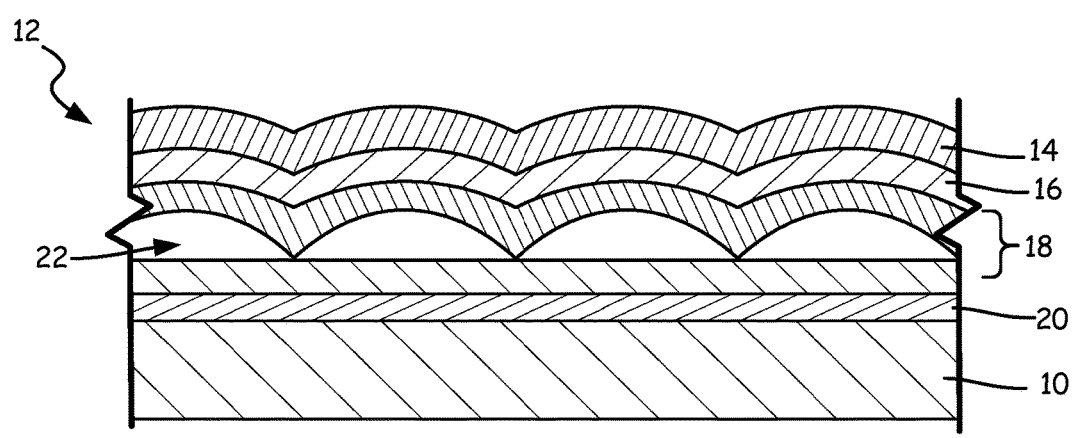
FIG. 1 is a perspective view of a pneumatic de-icer boot in a distended condition.

FIG. 1 illustrates an aircraft component having a deicer boot according to the present disclosure. As shown in FIG. 1, aircraft component 10 is a wing. However, aircraft component 10 can also be a fairing, strut or any other externally exposed aircraft structure that can accumulate ice during operation of the aircraft. Deicer boot 12 includes outer layer 14, inner layer 16, carcass layer 18 and bond layer 20.

Outer layer 14 is located on the external surface (or breezeside) of aircraft component 10. The composition of outer layer 14 is described in greater detail below. Inner layer 16 is located between outer layer 14 and aircraft structure 10. According to the prior art, inner layer 16 provides support for the retraction of outer layer 14. Inner layer 16 often contains a natural rubber. According to the present disclosure, inner layer 16 can be present as shown in FIG. 1. Alternatively, the composition of outer layer 14 allows for the omission of inner layer 16 entirely. Carcass layer 18 is located between inner layer 16 and aircraft structure 10. Carcass layer 18 includes inflation tubes 22. Inflation tubes 22 communicate with an air supply located on the aircraft (not shown). When air from the air supply is delivered to inflation tubes 22, inflation tubes 22 expand causing carcass layer 18, inner layer 16 and outer layer 14 to move away from aircraft structure 10. FIG. 1 shows outer layer 14 in a distended condition (i.e. inflation tubes 22 are pressurized). This movement causes accumulated ice on outer layer 14 to crack and be removed from outer layer 14. A detailed description of deicer boots is provided by U.S. Pat. No. 6,520,452.

In prior art deicer boots, the outer layer typically contained neoprene or a polyester urethane, and the inner layer was typically a natural rubber. The neoprene or polyester urethane elastomer layer provided erosion and chemical resistance, but had relatively poor elasticity at low temperatures. The natural rubber layer provided the elasticity needed for the outer layer to retract and reform to the aircraft structure once the inflation tubes were deflated. A carbon material (e.g., carbon black) could be added to the prior art elastomer layer to improve conductivity and reduce the likelihood of static discharge and provide additional strength. However, the carbon material was generally added to the elastomer in a non-ordered fashion (i.e. simple mixing). This resulted in a random distribution of carbon material throughout the elastomer layer. According to the present disclosure, outer layer 14 possesses the necessary strength, erosion resistance, and elasticity to eliminate the need for the natural rubber layer used in prior art deicer boots and yields a breezeside layer that has advantages compared to an elastomer containing randomly distributed carbon black.

In some embodiments of the present disclosure, outer layer 14 is a non-woven fiber fabric sheet that includes pluralities of elastomer fibers. Suitable elastomer fibers include neoprene, polyurethanes, natural rubbers and any other elastomers used to form the outer layer of a deicer boot. The elastomer fibers can be nanofibers (diameters less than 1000 nanometers) or microfibers (diameters smaller than a strand of silk) or a mixture of nanofibers and microfibers. The non-woven fiber fabric sheet of outer layer 14 also includes a carbon allotrope material that is aligned with one or more of the plurality of elastomer fibers. The carbon allotrope material is aligned with an elastomer fiber so that it is contained within or on the surface of the elastomer fiber. Suitable carbon allotrope materials include carbon nanotubes, graphene, graphite and carbon black. Carbon nanotubes can be single-walled carbon nanotubes or multi-walled carbon nanotubes. By aligning the elastomer fibers with the carbon allotrope materials, the non-woven fiber fabric of outer layer 14 is strengthened when compared to elastomer fibers that are simply mixed with a carbon material in a non-ordered fashion.

In one embodiment of the present disclosure, an elastomer fiber and the carbon allotrope material is aligned by electrospinning the elastomer fiber with the carbon allotrope material. Electrospinning uses an electric charge to draw a very fine fiber from a polymer solution. When a sufficiently high voltage is applied to a liquid droplet, the liquid becomes charged and electrostatic repulsion counteracts the surface tension of the droplet causing the droplet to stretch. Once a critical point is reached, a stream of liquid erupts from the surface of the droplet. Where the molecular cohesion of the liquid is sufficiently high, a charged liquid jet is formed. The jet is elongated due to electrostatic repulsion initiated at small bends in the fiber and is deposited on a grounded collector. The jet dries in flight, resulting in a uniform fiber due to the elongation and thinning of the fiber due to the bending instability caused by the electrostatic repulsion. The polymer (e.g., polyurethane) solution can include the carbon allotrope material so that when the solution is electrospun, the carbon allotrope material is contained within the resulting electrospun fiber.

Figure 2:
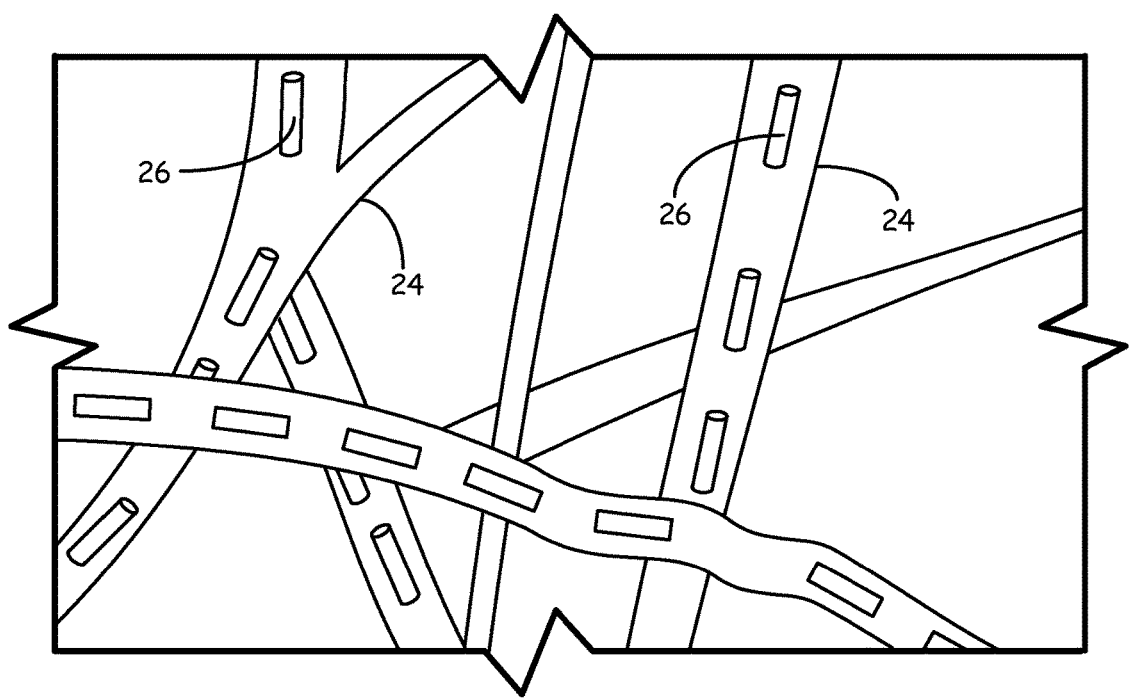
FIG. 2 is a schematic view of nanofibers formed by electrospinning to contain aligned carbon allotrope materials.

FIG. 2 schematically illustrates one example of a carbon allotrope material contained within an elastomer fiber. Elastomer fiber 24 is formed at the spinning tip of an electrospinning apparatus (not shown). The electrospinning apparatus can include a power supply and pump for delivering the elastomer solution. Elastomer fiber 24 contains aligned carbon allotrope material 26 by electrospinning as described above. Carbon allotrope material 26 is aligned within or on the surface of elastomer fiber 24, rather than merely mixed with fibers 24 in a random, non-ordered fashion. For example, carbon nanotubes have a diameter and a length in a direction perpendicular to the diameter. Generally, the length of a carbon nanotube is greater than its width. As elastomer fiber 24 is electrospun, carbon nanotubes present in the elastomer solution will generally form within fiber 24 or on the surface of fiber 24 so that the length of the carbon nanotube extends in roughly the same direction as fiber 24. That is, the length of the carbon nanotube extends in generally the same direction as the length of fiber 24. While some amount of "tangling" or "intertwining" can occur during electrospinning, the elastomer fibers and carbon allotrope material form a non-woven fiber fabric. A number of elastomer fibers, some with aligned carbon allotrope materials, are tangled together to form the non-woven fiber fabric sheet.

In some embodiments, the non-woven fiber fabric with elastomer fibers 24 and aligned carbon allotrope material 26 are melted and/or cured following electrospinning to form a solid sheet that can be applied as outer layer 14 to aircraft structure 10. In other embodiments, additional non-electrospun elastomers are applied to the non-woven fiber fabric formed by electrospinning. Furthermore, additives such as antioxidants and carbon black can be incorporated into the additional non-electrospun elastomers. The additional non-electrospun elastomers and additives can be applied to the non-woven fiber fabric by hot pressing, soaking, dipping, brushing, spraying or using other deposition techniques. Additives can also be added to the polymer solution used to form the electrospun elastomer fibers in the same way as carbon allotrope material 26. In some embodiments, the non-woven fiber fabric is applied to inner layer 16, which further improves the elasticity of outer layer 14. In other embodiments, inner layer 16 can be omitted.

Not all elastomer fibers in the non-woven fiber fabric contain aligned carbon allotrope material. In some embodiments, only a portion of the elastomer fibers contain aligned carbon allotrope material. The loading of carbon allotrope material in the elastomer fibers of outer layer 14 can vary. In embodiments where conductivity is the primary concern, the carbon allotrope material can have a relatively low loading. For example, the non-woven fiber fabric sheet of outer layer 14 can contain about 0.5% carbon nanotubes by weight to provide outer layer 14 with the necessary conductivity to prevent static discharges that can damage outer layer 14 and aircraft structure 10. This loading level also provides more mechanical strength benefits than non-aligned carbon nanotubes at the same concentration. In other embodiments, the non-woven fiber fabric of outer layer 14 can contain about 0.5% graphene or carbon black by weight. In embodiments where mechanical strength is a primary concern, the carbon allotrope material can have a heavier loading. For example, the non-woven fiber fabric of outer layer 14 can contain up to about 5% carbon nanotubes by weight to improve the strength and erosion resistance of outer layer 14. In other embodiments, the non-woven fiber fabric of outer layer 14 can contain up to about 5% graphene or carbon black by weight.

Figure 3:
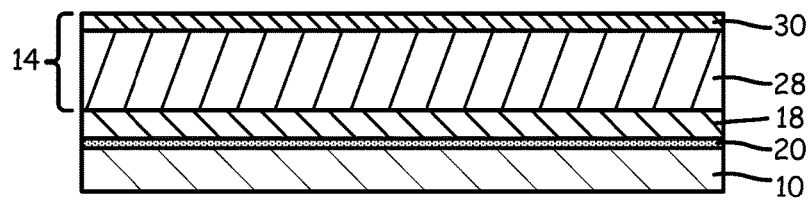
FIG. 3 is a schematic view of a non-woven electrospun fiber fabric with an icephobic material.
Figure 4:
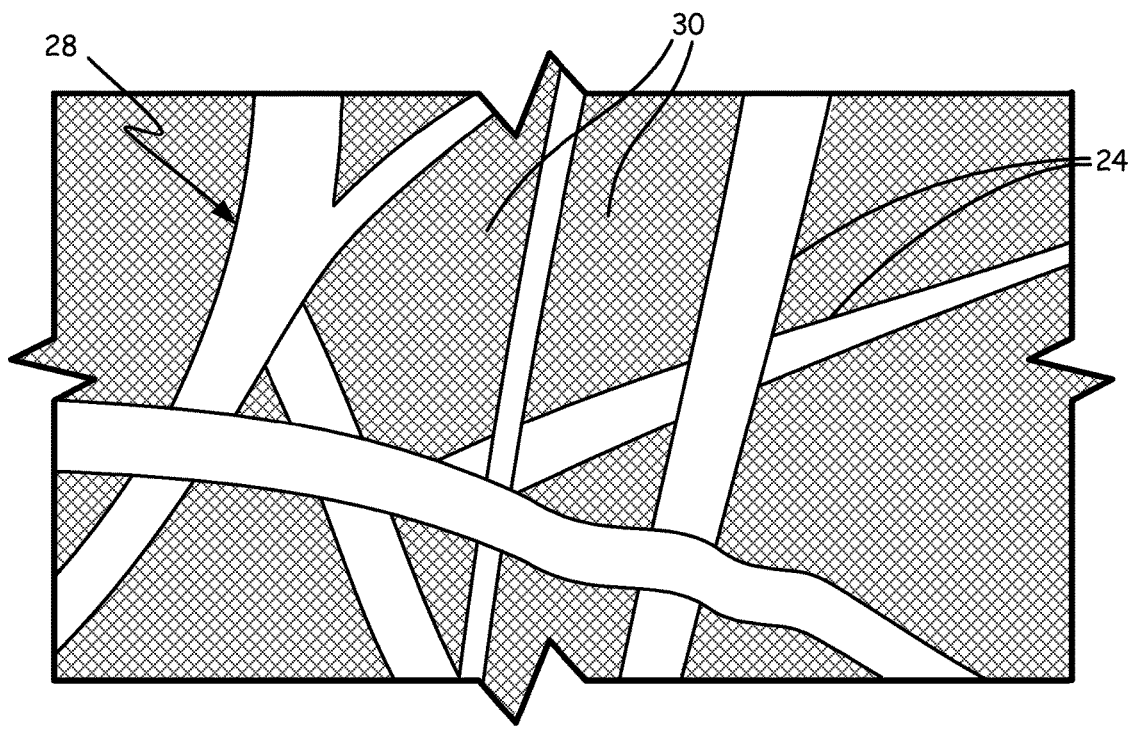
FIG. 4 is a schematic view of an elastomer scaffold containing an icephobic material.

In addition to the non-electrospun elastomers and additives described above, outer layer 14 can also contain icephobic materials on its breezeside surface (external surface away from aircraft structure 10). Icephobic materials repel ice and/or prevent ice formation. Suitable icephobic materials include HybridShield® Icephobic and HybridSil Fire/Blast (both available from NanoSonic, Giles County, Va.), and low ice adhesion compounds. Examples of low ice adhesion compounds include siloxanes, fluorocarbons, fluorocarbon and siloxane hybrids, hyperbranched polycarbosiloxanes, polysiloxanes and combinations thereof. Icephobic materials can be applied to the non-woven fiber fabric sheet of outer layer 14. The icephobic materials can both penetrate the fabric sheet and form a layer on the sheet's outer surface. In some embodiments, just enough icephobic material is applied to cover the outer surface of the non-woven fiber fabric. Minimizing the amount of icephobic material applied to the non-woven fiber fabric allows outer layer 14 to maintain its elasticity at low temperatures. The icephobic material can be applied to the non-woven fiber fabric by brushing, spraying, dipping, roll coating or other deposition techniques. FIG. 3 illustrates a schematic view of non-woven fiber fabric sheet 28 with icephobic material 30, which make up outer layer 14. While FIG. 3 shows icephobic material 30 as a layer on top of sheet 28, icephobic material 30 also penetrates into sheet 28, filling voids between the fibers of sheet 28. FIG. 4 is a view of an elastomer scaffold (sheet 28 having elastomer fibers 24) containing icephobic material 30.

Figure 5:
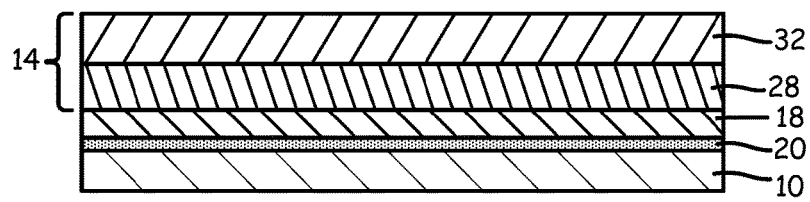
FIG. 5 is a schematic view of a matrix of non-woven electrospun fiber fabric and silver-colored polyurethane elastomer.

Outer layer 14 can also include additives to modify its color. Neoprene pneumatic deicer boots are normally black due to the presence of carbon black filler. Some aircraft component providers prefer their aircraft components to have particular colors. In some cases, silver aircraft components are desired or required. Polyurethane deicer boots can contain aluminum flake fillers so that they have a silver color. However, neoprene boots with carbon black generally possess better erosion resistance and low temperature properties than silver polyurethane boots. The non-woven fiber fabric of outer layer 14 (containing elastomer fibers aligned with carbon allotrope material) can be combined with an aluminum flake-filled polyurethane elastomer layer to provide an outer layer 14 that has better resistance and low temperature properties than a silver polyurethane boot while still possessing the silver color. The non-woven fiber fabric sheet of outer layer 14 can be embedded onto an existing polyurethane elastomer having aluminum flake. FIG. 5 shows a silver-colored polyurethane elastomer applied to the non-woven fiber fabric sheet so that the silver-colored polyurethane elastomer covers the non-woven fiber fabric sheet. As shown in FIG. 5, silver-colored polyurethane elastomer 32 is applied to non-woven fiber fabric sheet 28. The silver-colored polyurethane elastomer can be applied to the non-woven fiber fabric by hot pressing, brushing, spraying, dipping, roll coating or other deposition techniques. While FIG. 5 shows silver-colored polyurethane elastomer 32 as a layer on top of sheet 28, silver-colored polyurethane elastomer 32 also penetrates into sheet 28, filling voids between the fibers of sheet 28. In another embodiment, aluminum flake material can be added to a polymer solution prior to electro spinning, and the aluminum flake material can introduced into elastomer fibers 24 in a similar fashion to carbon allotrope material 26.

As described above, a method of forming a layer of a deicer boot includes the steps of aligning a carbon allotrope material with an elastomer fiber, joining the elastomer fiber with a plurality of additional elastomer fibers to form a non-woven fiber fabric, and incorporating the non-woven fiber fabric into a sheet. The step of aligning the elastomer fibers with the carbon allotrope material can include electrospinning. Carbon allotrope materials can be electrospun with the elastomer fibers so that the carbon allotrope materials are contained within or on the fibers. The non-woven fiber fabric can be melted and/or cured to form the sheet. The sheet can be applied to aircraft structure 10 as outer layer 14. Alternatively, the non-woven fiber fabric can be embedded into an existing neoprene or polyurethane sheet (with or without aluminum flake) to form outer layer 14. An icephobic material can also be applied to the sheet.

Aligning carbon allotrope materials with elastomer fibers as disclosed herein provides a non-woven fiber fabric sheet that possesses a number of benefits as an outer layer of a deicer boot. First, the non-woven fiber fabric containing aligned reinforced particles, after being fused or cured into a solid sheet or embedded into a second rubber material, is stronger and more resistant to wind, rain and sand erosion when compared to current elastomer layers (either plain or containing non-ordered carbon materials) while still providing the necessary conductivity to prevent damaging static discharge. Second, the presence of aligned carbon allotropes improves the low temperature properties (improved elasticity and reduced brittleness) that can allow for the omission of inner layer 16.

Discussion of Possible Embodiments

The following are non-exclusive descriptions of possible embodiments of the present invention.

A deicer boot can include an aircraft structure and an outer layer. The outer layer can include a plurality of elastomer fibers and a carbon allotrope material. The carbon allotrope material can be aligned with at least one elastomer fiber belonging to the plurality of elastomer fibers.

The deicer boot of the preceding paragraph can optionally include, additionally and/or alternatively, any one or more of the following features, configurations and/or additional components:

A further embodiment of the foregoing deicer boot can include an inner elastomer layer located between the outer layer and the aircraft structure, a carcass layer having inflation tubes and located between the aircraft structure and the inner layer, and a bond layer adjacent the carcass layer and configured to attach the carcass layer to the aircraft structure.

A further embodiment of any of the foregoing deicer boots can include that the carbon allotrope material is selected from the group consisting of carbon nanotubes, graphene, graphite, carbon black and combinations thereof.

A further embodiment of any of the foregoing deicer boots can include that the elastomer fibers comprise a material selected from the group consisting of neoprene, polyurethane, natural rubbers and combinations thereof.

A further embodiment of any of the foregoing deicer boots can include that the plurality of elastomer fibers and the carbon allotrope material form a non-woven electrospun fiber fabric sheet.

A further embodiment of any of the foregoing deicer boots can include an icephobic material located on the outer layer.

A further embodiment of any of the foregoing deicer boots can include that the icephobic material is selected from the group consisting of siloxanes, fluorocarbons, polycarbosiloxanes, polysiloxanes, and combinations thereof.

A further embodiment of any of the foregoing deicer boots can include aluminum flake.

A further embodiment of any of the foregoing deicer boots can include that the aluminum flake is aligned with at least one elastomer fiber belonging to the plurality of elastomer fibers.

A further embodiment of any of the foregoing deicer boots can include that the non-woven electrospun fiber fabric sheet further comprises a non-electrospun elastomer.

A further embodiment of any of the foregoing deicer boots can include that the non-woven electrospun fiber fabric sheet further comprises an additive selected from the group consisting of antioxidants, carbon black and combinations thereof.

A method of forming a layer of a deicer boot can include aligning a carbon allotrope material with a first elastomer fiber, joining the first elastomer fiber with a plurality of additional elastomer fibers to form a non-woven fiber fabric, and incorporating the non-woven fiber fabric into a sheet.

The method of the preceding paragraph can optionally include, additionally and/or alternatively, any one or more of the following features, configurations and/or additional components:

A further embodiment of the foregoing method can include that the carbon allotrope material is selected from the group consisting of carbon nanotubes, graphene, graphite, carbon black and combinations thereof.

A further embodiment of any of the foregoing methods can include that aligning the first elastomer fiber with the carbon allotrope material is carried out by electrospinning an elastomer solution containing the first carbon allotrope material.

A further embodiment of any of the foregoing methods can include that incorporating the non-woven fabric into the sheet comprises fusing or melting the non-woven fabric to form the sheet.

A further embodiment of any of the foregoing methods can include applying an icephobic material to the sheet, where the icephobic material is selected from the group consisting of siloxanes, fluorocarbons, polycarbosiloxanes, polysiloxanes, and combinations thereof.

A further embodiment of any of the foregoing methods can include aligning a first elastomer fiber with aluminum flake material by electrospinning an elastomer solution containing the aluminum flake material.

A further embodiment of any of the foregoing methods can include that the sheet is a neoprene or polyurethane sheet, and wherein incorporating the non-woven fabric into the sheet comprises embedding the non-woven fabric into the sheet.

A further embodiment of any of the foregoing methods can include that the sheet is a polyurethane elastomer sheet having aluminum flake, and wherein incorporating the non-woven fabric into the sheet comprises embedding the non-woven fabric into the sheet.

A deicer boot can include an aircraft structure and an outer layer. The outer layer can include a plurality of elastomer fibers and aluminum flake. The aluminum flake can be aligned with at least one elastomer fiber belonging to the plurality of elastomer fibers While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A deicer boot comprising:
   an aircraft structure; and
   an outer layer comprising:
      a plurality of elastomer fibers; and
      a carbon allotrope material within at least one elastomer fiber belonging to the plurality of elastomer fibers, wherein the carbon allotrope material is aligned with the at least one elastomer fiber.

2. The deicer boot of claim 1, further comprising:
   an inner elastomer layer located between the outer layer and the aircraft structure;
   a carcass layer having inflation tubes and located between the aircraft structure and the inner layer; and
   a bond layer adjacent the carcass layer and configured to attach the carcass layer to the aircraft structure.

3. The deicer boot of claim 1, wherein the carbon allotrope material is selected from the group consisting of carbon nanotubes, graphene, graphite, carbon black and combinations thereof.

4. The deicer boot of claim 1, wherein the elastomer fibers comprise a material selected from the group consisting of neoprene, polyurethane, natural rubbers and combinations thereof.

5. The deicer boot of claim 1, wherein the plurality of elastomer fibers and the carbon allotrope material form a non-woven electrospun fiber fabric sheet.

6. The deicer boot of claim 1, further comprising an icephobic material located on the outer layer.

7. The deicer boot of claim 6, wherein the icephobic material is selected from the group consisting of siloxanes, fluorocarbons, polycarbosiloxanes, polysiloxanes, and combinations thereof.

8. The deicer boot of claim 1, wherein the outer layer further comprises:
   aluminum flake.

9. The deicer boot of claim 8, wherein the aluminum flake is aligned with at least one elastomer fiber belonging to the plurality of elastomer fibers.

10. The deicer boot of claim 5, wherein the non-woven electrospun fiber fabric sheet further comprises a non-electrospun elastomer.

11. The deicer boot of claim 10, wherein the non-woven electrospun fiber fabric sheet further comprises an additive selected from the group consisting of antioxidants, carbon black and combinations thereof.

12. A method of forming a layer of a deicer boot, the method comprising:
   aligning a carbon allotrope material within a first elastomer fiber with the first elastomer fiber;
   joining the first elastomer fiber with a plurality of additional elastomer fibers to form a non-woven fiber fabric; and
   incorporating the non-woven fiber fabric into a sheet.

13. The method of claim 12, wherein the carbon allotrope material is selected from the group consisting of carbon nanotubes, graphene, graphite, carbon black and combinations thereof.

14. The method of claim 12, wherein aligning the first elastomer fiber with the carbon allotrope material is carried out by electrospinning an elastomer solution containing the first carbon allotrope material.

15. The method of claim 12, wherein incorporating the non-woven fabric into the sheet comprises fusing or melting the non-woven fabric to form the sheet.

16. The method of claim 12, further comprising:
   applying an icephobic material to the sheet, wherein the icephobic material is selected from the group consisting of siloxanes, fluorocarbons, polycarbosiloxanes, polysiloxanes, and combinations thereof.

17. The method of claim 12, further comprising:
   aligning a first elastomer fiber with aluminum flake material by electro spinning an elastomer solution containing the aluminum flake material.

18. The method of claim 12, wherein the sheet is a neoprene or polyurethane sheet, and wherein incorporating the non-woven fabric into the sheet comprises embedding the non-woven fabric into the sheet.

19. The method of claim 12, wherein the sheet is a polyurethane elastomer sheet having aluminum flake, and wherein incorporating the non-woven fabric into the sheet comprises embedding the non-woven fabric into the sheet.

20. A deicer boot comprising:
   an aircraft structure; and
   an outer layer comprising:
      a plurality of elastomer fibers; and
      aluminum flake material within at least one elastomer fiber belonging to the plurality of elastomer fibers, wherein the aluminum flake is aligned with the at least one elastomer fiber.

* * * * *